United States Patent [19]
Namioka et al.

[11] Patent Number: 5,313,630
[45] Date of Patent: May 17, 1994

[54] SYSTEM OF OBJECT ORIENTED INHERITANCE USING THE TEMPORAL STATUS OF SUPERCLASSES

[75] Inventors: Miyoko Namioka, Sagamihara; Kazuhiro Satoh, Ebina; Youichi Yamamoto; Keiji Moki, both of Kawasaki, all of Japan

[73] Assignees: Hitachi, Ltd.; Hitachi Microcomputer System Ltd., Tokyo, Japan

[21] Appl. No.: 690,592

[22] Filed: Apr. 23, 1991

[30] Foreign Application Priority Data

Apr. 25, 1990 [JP] Japan .................. 2-107601

[51] Int. Cl.$^5$ .................. G06F 15/40; G06F 7/00
[52] U.S. Cl. .................. 395/600; 364/DIG. 1; 364/282.1; 364/281.1; 364/281.3; 364/281.8; 364/280.4; 395/650
[58] Field of Search .................. 364/200, 300, 512, 513, 364/578; 395/650, 600

[56] References Cited

U.S. PATENT DOCUMENTS

| | | | |
|---|---|---|---|
| 5,095,522 | 3/1992 | Fujita et al. | 395/200 |
| 5,119,475 | 6/1992 | Smith et al. | 395/156 |
| 5,121,478 | 6/1992 | Rao | 395/157 |
| 5,161,225 | 11/1992 | Abraham et al. | 395/600 |
| 5,202,981 | 4/1993 | Shackelford | 395/600 |
| 5,224,204 | 6/1993 | Tsuruta et al. | 395/51 |

*Primary Examiner*—Thomas C. Lee
*Assistant Examiner*—Wayne Amsbury
*Attorney, Agent, or Firm*—Fay, Sharpe, Beall, Fagan, Minnich & McKee

[57] ABSTRACT

An object-oriented data base management system connected to a plurality of data bases includes a class definition unit, a static inheritance processing unit included within the class definition unit, a message processing unit, a dynamic inheritance processing unit included within the message processing unit, and an object management unit. The object-oriented data base management system is of the type that defines the inheritance relationship between a plurality of classes and an arbitrary class and the inheritance priority order, the class being a basic unit of programming, and executes the data processing by solving the inheritance relationship between classes in accordance with the priority order. There is prepared, for each class, updatable inheritance solution status information which the static inheritance processing unit causes to be stored in a table. The inheritance solution status information includes status information and time information. The status information is representative of whether or not inheritance between the class and the superclasses can be completely solved, and the time information is representative of a time when the status is established. When a message processing is requested for an object of a class, the dynamic inheritance processing unit searches the method designated by the message while referring to the inheritance solution status information regarding the class and the superclass stored in the table.

7 Claims, 10 Drawing Sheets

FIG. 6B

| CLASS NAME | c11 | c22 | c33 | c99 |
|---|---|---|---|---|
| STATUS | C | NC | C | C |
| STATUS ESTABLISHED TIME | Tc11 | Tc22 | Tc33 | Tc99 |

51 — CLASS NAME row
52 — STATUS row
53 — STATUS ESTABLISHED TIME row
50 — table

FIG. 6C

```
class cNew {
    inherit :
        c11,c22,c33
    instance variable :
        pc1,
        pc2
    method :
        m0,
        mc1
}
```

40-4

SYSTEM OF OBJECT ORIENTED INHERITANCE USING THE TEMPORAL STATUS OF SUPERCLASSES

BACKGROUND OF THE INVENTION

The present invention relates to an object-oriented data processing technique, and more particularly to an inheritance solution processing method and apparatus for solving inheritance relationships between classes in an object-oriented data processing system.

One of the advantages of an object-oriented data processing system is a concept of inheritance between classes each constituting a basic programming unit. For example, it is possible for an "automobile class" or "ship class" to inherit, from a "vehicle class", general vehicle attributes (such as manufacturer name, weight, and etc.) and a function (such as calculation of pressure). The term "inheritance" means that a lower class inherits or merges the attribute and function of an upper class. The "vehicle class" having a higher hierarchic concept is called a "superlcass" of the "automobile class" or "ship class", whereas the "automobile class" or "ship class" having a lower hierarchic concept is called a "subclass" of the "vehicle class". In an object-oriented system, such as inheritance function of a class encourages modular design and reuse of programs.

In most of object-oriented systems, a class can have one or more superclasses, and can inherit attributes from them. Such a function is called a multiple inheritance. With multiple inheritance, the following collisions occur between names of attributes and functions to be inherited:

(1) a collision between a class and a superclass, and
(2) a collision between superclasses of a class.

Such a collision is solved in accordance with particular rules provided to each system. For example, for a collision between a class and a superclass, a definition in the class is preferentially used. For a collision between superclasses of a class, a definition in the first superclass within the superclass list is preferentially selected.

Encapsulation and Inheritance in Object-Oriented Programming Languages" by Alan Snyder, 1986 ACM 0-89791-204-7/86/0900-0038 discloses a method for resolving the name conflict such as "Graph-Oriented Solutions", "Linear Solutions" and "Tree Solutions". With these solutions, if a conflict occurs, it is determined which class is adopted or not adopted and which criterion is used for such determination.

An operation of an object-oriented system corresponds to processing a message to be sent to an object. A message generally designates a method name representative of a function (hereinafter also called a method) to be applied to an object (hereinafter also called a receiver, meaning a receptor of a message) and a parameter for the method. In an object-oriented system having an inheritance function, in order to process a message, it is necessary to locate a method designated by the message from a class to which the receiver belongs or from its superclass.

In order to determine the time when a method is located, there is a dynamic inheritance processing scheme by which a search up to a superclass is executed while a message is processed, and a static inheritance processing scheme by which a class merges the attribute and function of its superclass when the class is compiled. According to the dynamic inheritance processing scheme, it is sufficient if a necessary superclass is defined at the time when a message is processed. Therefore, application development has a high flexibility. However, there is a large overhead of class search at the time of message processing. According to the static inheritance processing scheme, it is not necessary to search superclasses at the time of message processing, so that the message can be processed at a high speed. However, it is required that all necessary superclasses must be defined at the time of compiling, resulting in less flexibility.

One method of solving such problems is disclosed, for example, in Japanese Patent Laid-open Publication JP-A 1-240936 "Inheritance Solution Method". According to this method, the inheritance of a designated class is solved in advance at the time of compiling, and at the time of processing a message, the inheritance of a class not solved as yet is solved at that time. According to the prior art method, while preserving a flexibility of application development, an overhead of class search for inheritance solution at the time of processing a message can be made as small as possible at any stage of application development.

The term "inheritance solution" used in the description of the prior art method means that a class on the subclass side merges the definition of a superclass into the internal form of the class.

An object-oriented system has been expected to be applied to the technical field dealing with complex data, typically a CAD/CAM, CASE, and the like. The above-described multiple inheritance function is effective for realizing a model of complicate data presently used in the art.

In realizing the inheritance function, it becomes necessary to provide a flexibility that the function obtained by inheritance is growing as application development progresses, as pointed out by the prior art method.

A basic unit constituting an object-oriented system is a class. In actual application development, it is useful that the executable range of a function obtained by inheritance be as wide as possible to the extent sufficient for the definition contents at the intermediate stage of application development, because the debugging work of a class can be made through local verification. It is therefore necessary to efficiently execute both a partial inheritance processing in accordance with the definition contents at a certain stage of application development and an inheritance re-processing in accordance with the definition of a new class or the updated definition of an old class.

At the intermediate stage of application development, inheritance from a superclass still not defined cannot be allowed. Even if a superclass has been defined. Inheritance may not be allowed depending upon a multiple inheritance collision solution rule specific to a system. For example, if a superclass having a higher priority order is not still defined, the definition contents to be inherited from a superclass having a lower priority order cannot be determined. The reason for this is as follows. Even if the definition contents are inherited from the superclass having a lower priority order and a debugging work and the like are carried out, these operations may be made invalid depending upon the definition contents of the superclass having a higher priority order.

The above problems are related to the contents of inheritance regarding a permission/prohibition of inheritance between a class and its superclass, and are independent from the timing of inheritance processing. The above-described prior art method does not concern this issue.

SUMMARY OF THE INVENTION

It is an object of the present invention to provide a class inheritance solution processing method and apparatus capable of obtaining a flexible application development environment, by which the inheritance status representative of whether inheritance of all superclasses of a class can be completely processed or not, and the time when the status is established, are stored and managed for each class, so that both a partial inheritance processing and an inheritance re-processing to be executed as the development progresses can be reliably and efficiently performed in accordance with the priority order of superclasses.

In order to achieve the above object, according to one aspect of the present invention, there is provided an object-oriented data processing and programming system which defines the inheritance relationship between a plurality of classes and an arbitrary class and the inheritance priority order of the plurality of classes, and executes the data processing by solving the inheritance relationship of the class in accordance with the priority order. The system is provided with a static inheritance processing unit, and a dynamic inheritance processing unit. The static inheritance processing unit causes a storage means to store inheritance solution status information for each class, the inheritance solution status information including status information representative of whether or not inheritance of all superclasses of an arbitrary class can be processed completely, and a status established time representative of the time when the status is established. The dynamic inheritance processing unit operates such that if a message processing of an arbitrary class is requested, it refers to the inheritance solution status information of the arbitrary class and the associated superclasses stored in the storage means, and searches a method designated by the message.

According to the present invention, the static inheritance processing unit judges whether or not inheritance of all superclasses of each class can be processed completely, in accordance with the priority order of superclasses, and generates and updates the inheritance solution status information including the status information representative of the judgment results, and the status established time. For example, in updating the inheritance solution status information of a class, a superclass having a higher priority order is sequentially selected as a target superclass. The status established time of the class is compared with that of the target superclass. If the former time is earlier than the latter time, the inheritance processing of the target superclass is recurrently executed. After the inheritance processing of the target superclass, the definition contents of the target superclass are merged into the class. Alternatively, if the former time is later than the latter time, it means that the inheritance solution of the superclass has not been updated. Therefore, the recurrent inheritance processing of the target superclass and merge of the definition contents thereof are not carried out. After the above processes, the status of the target superclass is checked. If the status is the incomplete solution status, inheritance of the superclass having a lower priority order than that of the target superclass is omitted to terminate the inheritance processing of the class. If the status of the target superclass is the complete solution status, a superclass having the next highest priority order is selected to repeat the above processes.

After the above-described processing of a class is executed, a similar inheritance processing is executed for subclasses for that class, thereby realizing a static inheritance processing for all classes associated with the class in interest. In this case, a list or table for storing names of subclasses for each class may be used for the management of subclasses, thereby efficiently deriving relational subclasses.

If a message processing is requested for an object of a class, a method designated by the message is searched generally from the class now in concern. Only if the method is not present within the class, a superclass is searched. In this case, the dynamic inheritance processing unit sequentially selects as a target superclass a superclass having a higher priority order. If the status of the target superclass is the incomplete solution status, a search is not carried out up to a superclass having a lower priority order than that of the target superclass.

BRIEF DESCRIPTION OF THE DRAWINGS

FIGS. 6A to 6C are diagrams showing particular examples of classes and inheritance solution status information, used for explaining the concept of an inheritance solution processing method of the present invention.

DESCRIPTION OF THE PREFERRED EMBODIMENTS

The structure and operation of an embodiment of the present invention will be described with reference to the accompanying drawings.

Figure 2:
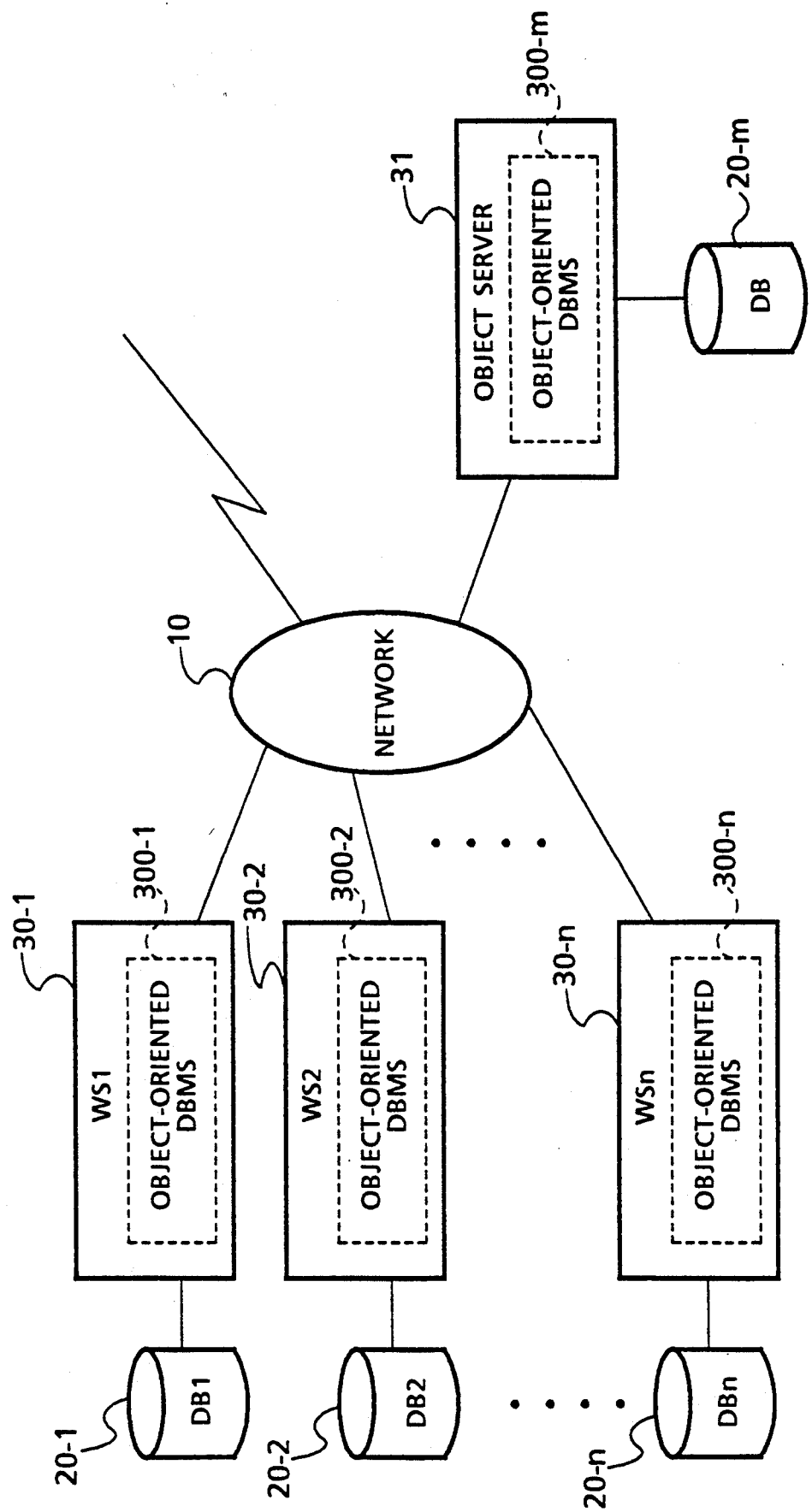
FIG. 2 shows an example of the structure of a data base system embodying the present invention.

FIG. 2 shows an example of the configuration of a data base system according to the present invention. In FIG. 2, reference numerals 20-1 to 20-n, and 20-m represent a data base, 30-1 to 30-n represent a workstation, 31 represents an object server, 300-1 to 300-n, and 300-m represent an object-oriented data base management system (DBMS). In this embodiment, a plurality of workstations 30-1 to 30-n are connected to a network 10. Object information is transferred between workstations via the object server 31. The workstations 30-1 to 30-n and the object server have individual object-oriented data base management systems 300-1 to 300-n, and 300-m, respectively.

Figure 3:
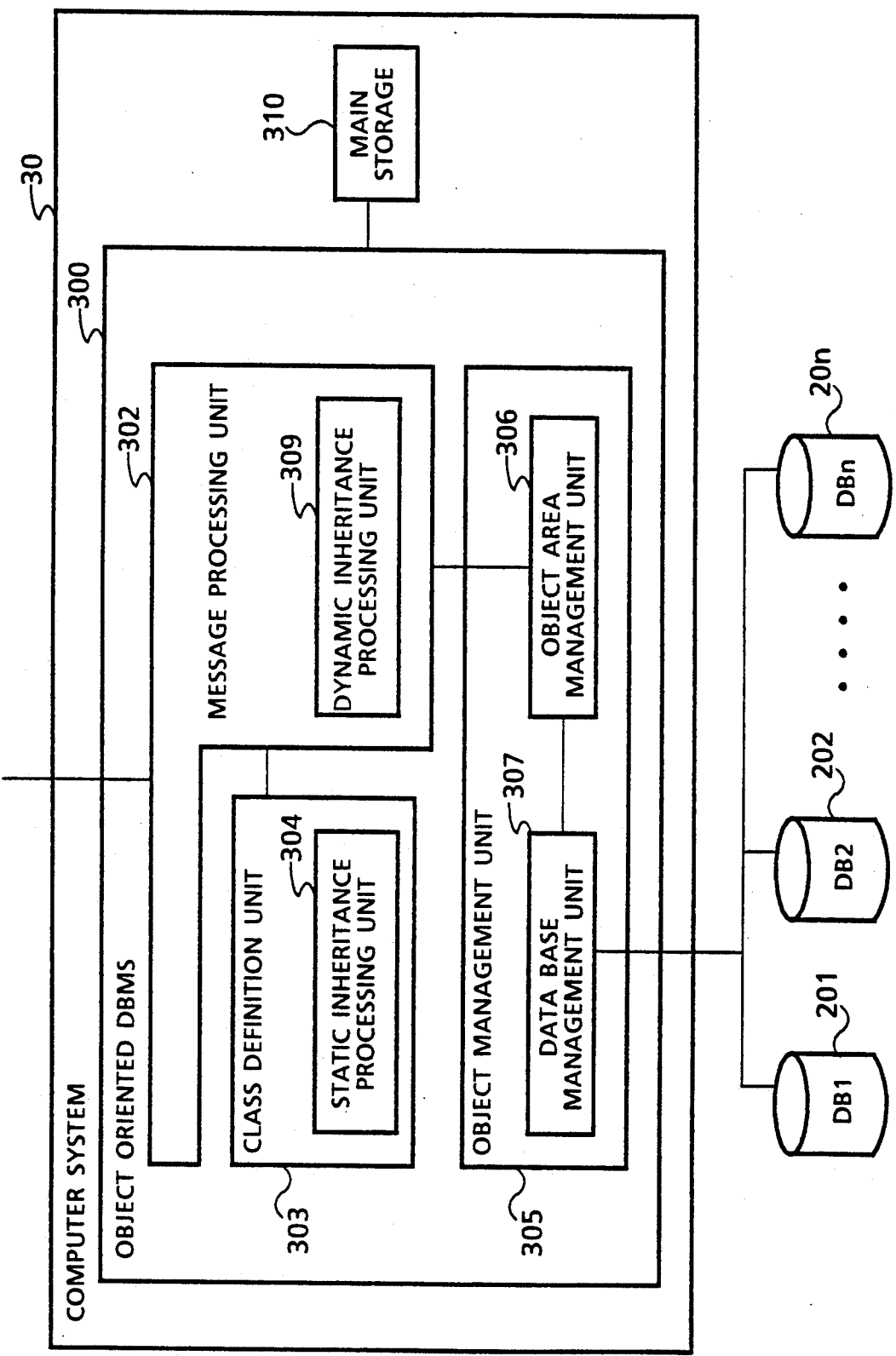
FIG. 3 shows an example of the functional structure of a data base management system (DBMS) according to the present invention.

FIG. 3 is a functional block diagram showing an embodiment of an object-oriented data base management system 300 according to the present invention. The object-oriented data base management system 300 is constructed of a message processing unit 302 having a dynamic inheritance processing unit 309 for executing a method of an object while dynamically executing an inheritance processing, a class definition unit 303 for defining a class, and an object management unit 305 for supervising the storage of an object. The class definition unit 303 analyzes a class definition described in the source form and generates a class object of a predetermined form. If there is a superclass in the class definition, a static inheritance processing unit 304 executes a static inheritance processing in accordance with the method specified by the present invention. The object management unit 305 includes an object area management unit 306 for supervising objects stored in a main storage 310, and a data base management unit 307 for supervising objects stored in a supplementary storage.

Object data bases 201 to 20n are connected to and controlled by the data base management unit 307.

Figure 4A:
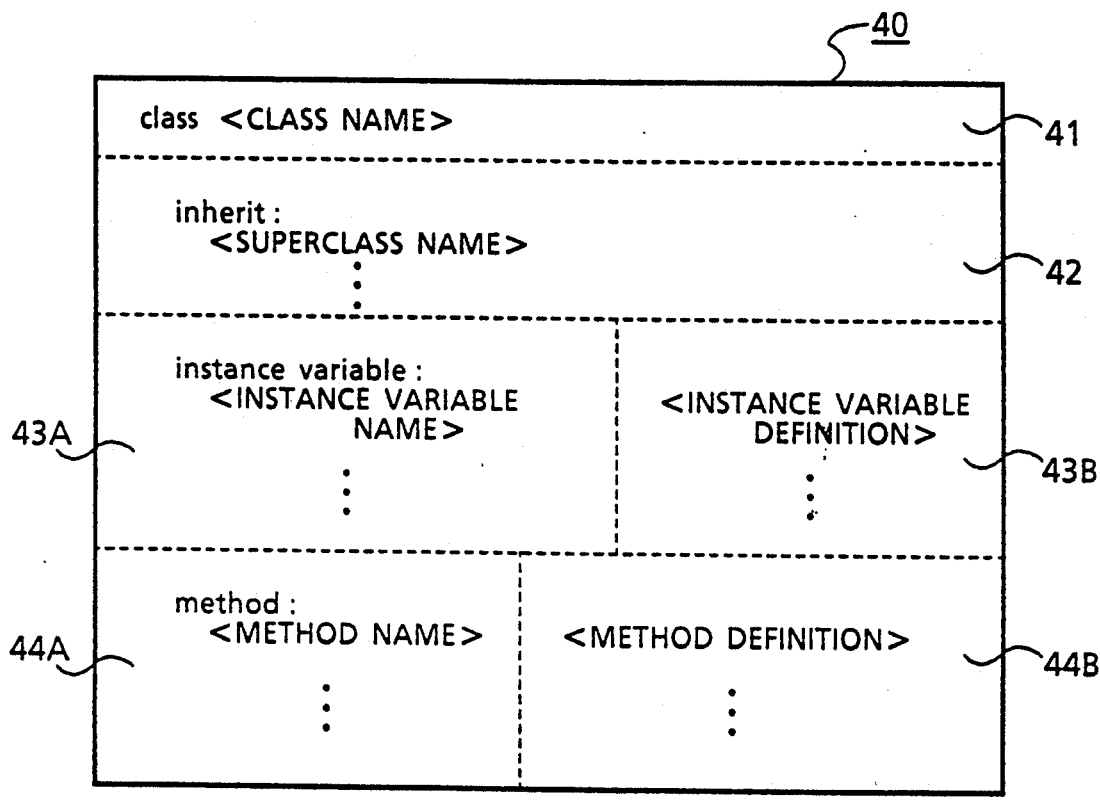
FIG. 4A shows an example of a class definition source form.

FIG. 4A shows an example of a class definition form. As shown in FIG. 4A, each class definition 40 is constructed of a <class name> 41 representative of a name of the class, a <superclass name> 42 representative of names of superclasses to be inherited, an <instance variable name> 43A and <instance variable definition> 43B for defining an instance variable of an instance belonging to the class, and a <method name> 44A and <method definition> 44B representative of a method providing a procedure belonging to the class.

Figure 4B:
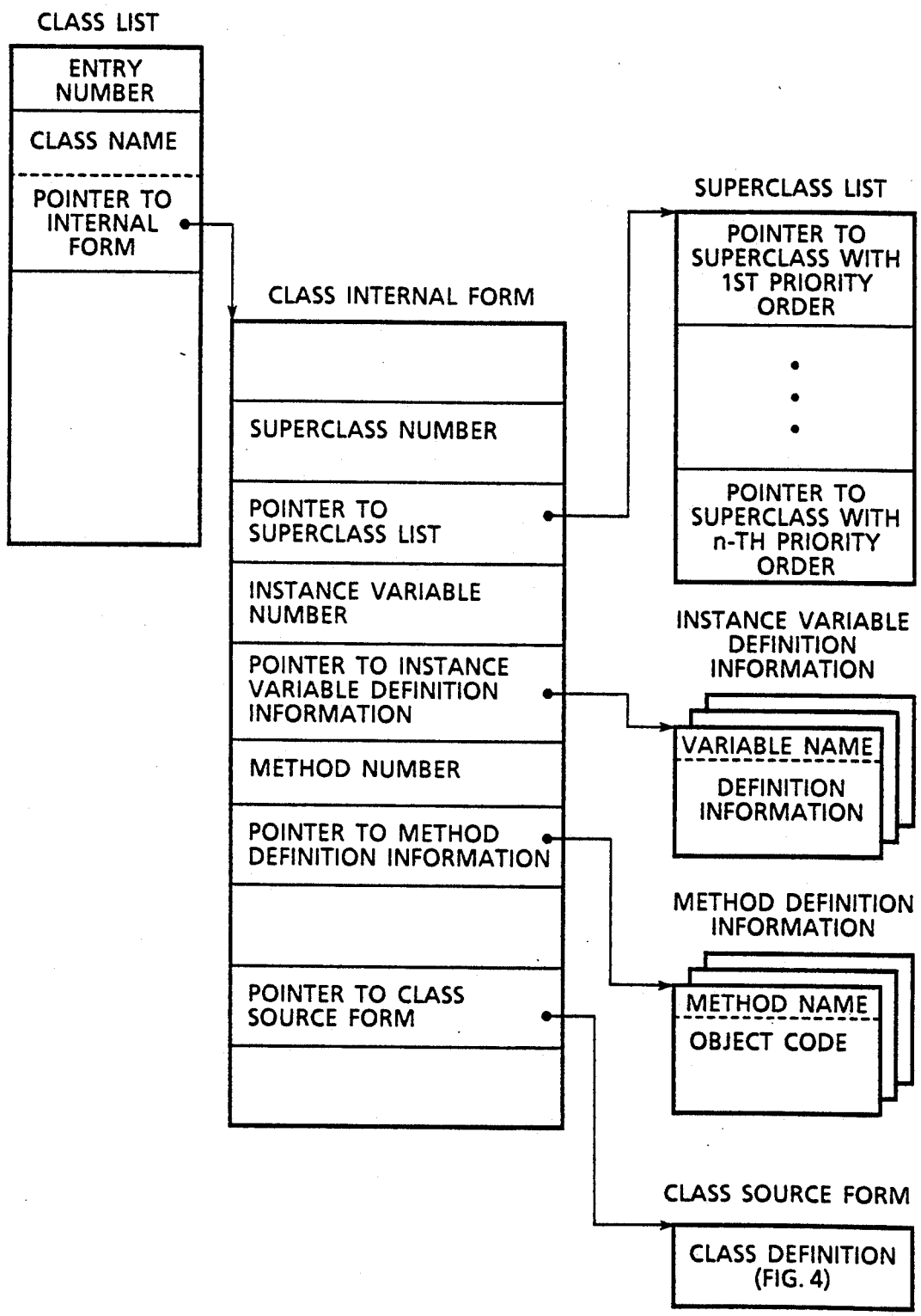
FIG. 4B shows an example of the internal form of a class.

FIG. 4B shows an internal form of a class defined by the class definition unit 303 while referring to the class definition described in a source form shown in FIG. 4A.

A class stores the number of superclasses, and pointers to respective superclasses. Pointers to superclasses are disposed in the priority order of each superclass.

The class further stores an instance variable name and its definition information, and a method name and its object code, respectively in a predetermined form. In this case, two approaches can be considered. Instance variables and methods to be inherited from a superclass are all stored in the class, or a part or whole of instance variables and methods to be inherited is not stored in the class but referred to the superclass at the time when they are necessary or inherited. According to the former approach, instance variables and methods necessary for a class can be obtained by searching only the class in interest, thereby speeding up information processing. However, information to be inherited is stored in duplicate, resulting in a poor memory efficiency. According to the latter approach, although there is no duplicated information, necessary information cannot be obtained until the target superclass is searched.

According to the present invention, it is assumed that information to be inherited is partially stored or not stored in a class. Namely, in accordance with the internal rule, the class definition unit 303 operates to output or not output definitions to be inherited from a superclass to the internal form of the class.

Figure 5:
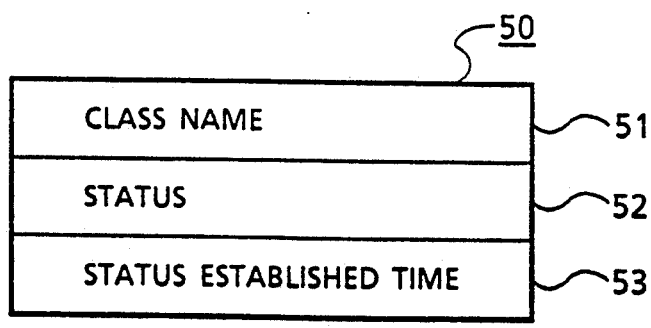
FIG. 5 is a diagram showing the contents of inheritance solution status information used with the present invention.

FIG. 5 shows the contents of a class inheritance solution status information table. In this table 50, a status 52 and a status established time 53 are stored for each class (class name) 51. The types and meanings of the status are as follows.

(i) Complete Solution Status: C

A status wherein there is no superclass designated in the class definition, or a status wherein all superclasses designated in the class definition are in a completely solved state after subjected to the static inheritance processing.

(ii) Incomplete Solution Status: NC

A status wherein among superclasses designated in the class definition, there is a superclass whose static inheritance processing has not been executed as yet, or a status wherein a static inheritance processing of a superclass under an incompletely solved state was executed.

The status established time 53 is a time when the status 52 is established in accordance with the execution results of a static inheritance processing.

Next, the concepts of the inheritance solution processing method according to the present invention will be described with reference to FIGS. 6A to 6C. In order to simplify the description, the description is directed to the case wherein classes (c11 to c33) have the definitions 40-1 to 40-3 as shown in FIG. 6A and a static inheritance status information table 50 as shown in FIG. 6B, and a new class (cNew) 40-4 shown in FIG. 6C is newly defined.

Figure 6A:
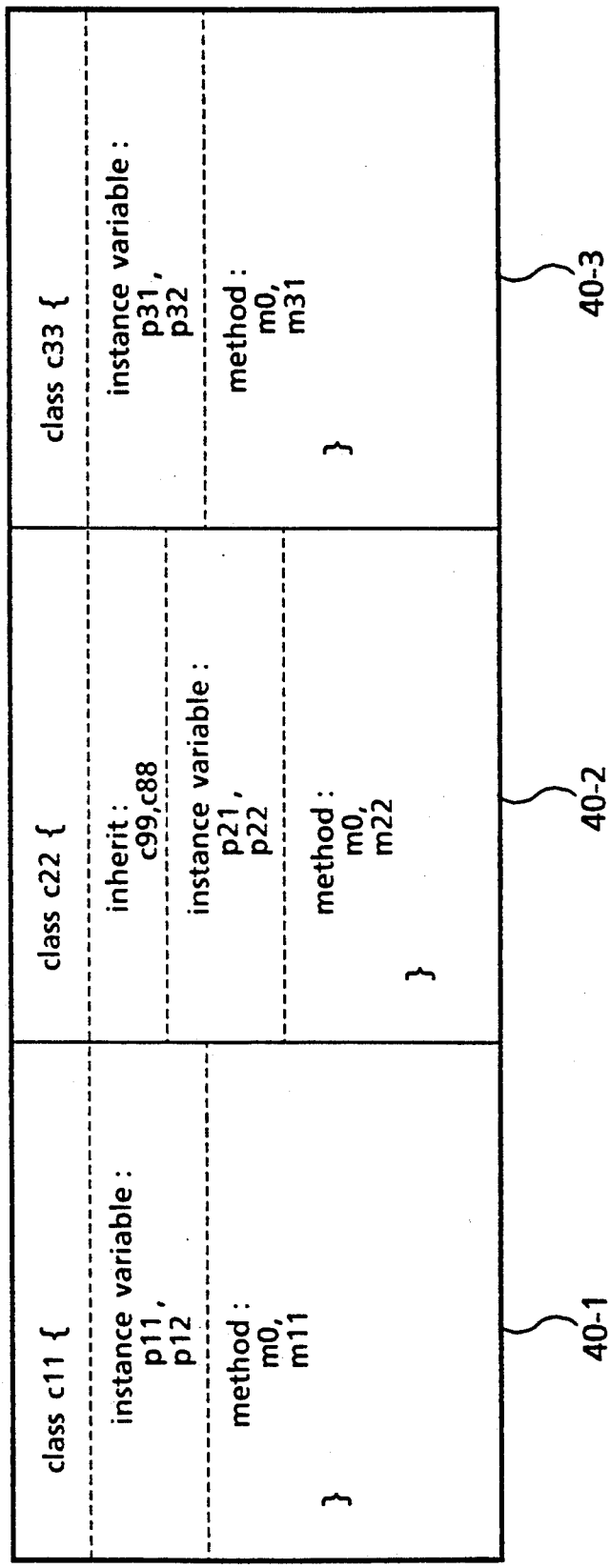

Referring to FIG. 6B, the status of the classes c11, c33, and c99 is the complete solution status C. The class c22 has superclasses c99 and c88 to be inherited, as seen from the definition 40-2 shown in FIG. 6A. The status 52 of the class c22 is the incomplete solution status NC as indicated in the table 50, because the inheritance of the superclass c99 having the complete solution status has been already solved but the inheritance of the other superclass c88 still having no class definition has not been solved as yet. The particular definition contents of the superclass c99 are omitted for the simplicity of description.

As shown in FIG. 6C, the class cNew has as superclasses the classes c11, c22, and c33 the priority order of which is the order as recited. In this embodiment, the class c11 is first selected as a target of static inheritance processing. Since the status of the class c11 is the complete solution status C, the inheritance solution processing is executed with respect to the class c11. Since the next superclass c22 has the incomplete solution status NC, this superclass c22 is subjected to the static inheritance processing to make it have the complete solution status. The class c22 has as superclasses the classes c99 and c88. Since the status of the class c99 is the complete solution status C, the status established times Tc22 and Tc99 are compared. If Tc22 is later than Tc99, i.e., if Tc22 is a later time, it is judged that the inheritance between c99 and c22 has been solved already. If not, for example, if the class c99 was updated after the static inheritance processing of the class c22 was made, it is necessary to again execute the static inheritance processing between the classes c99 and c22. Since the class c88 is not still defined, the static inheritance processing for the classes c88 and c22 is impossible at this time. Therefore, the static inheritance processing for the class c22 is terminated, and the status 52 (incomplete solution status) and the status established time 53 (Tc22) of the class c22 are updated on the table 50.

Returning back to the processes of defining the new class cNew, the static inheritance processing between the superclass c22 and new class cNew is executed. In this example, since the static inheritance processing of the superclass c22 under the incomplete solution status was made, the static inheritance processing of the superclass c33 at the next priority order will not provide an establishment of definitions to be inherited from the superclass c33. Accordingly, the static inheritance processing of the superclass c33 is omitted, and the static inheritance processing of the new class cNew is terminated while adding the status (incomplete solution status) and status established time (TcNew) of the class cNew to the static inheritance status information table 50.

Figure 1:
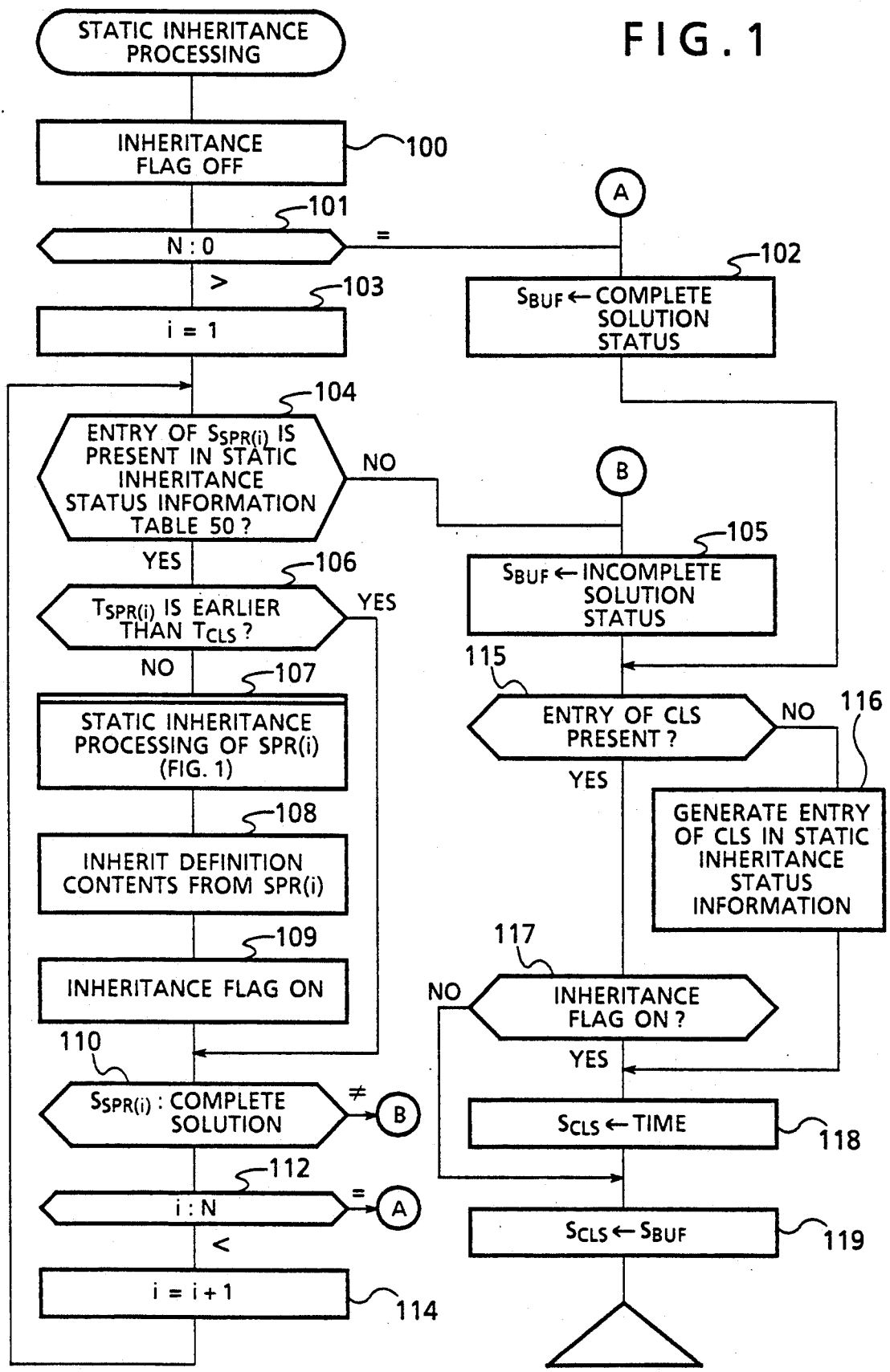
FIG. 1 is a flow chart showing an inheritance solution processing according to an embodiment of the present invention.

FIG. 1 is a flow chart showing the procedure of the above-described static inheritance processing.

In FIG. 1, a term "CLS" represents a target class to be subject to the inheritance solution processing. "SPR" represents a superclass of a CLS. "SPR(i)" represents a superclass having the priority order i. "N" represents the number of superclasses. "$S_{SPR(i)}$" represents the status of a superclass SPR(i). "$S_{CLS}$" represents the status of a CLS. "$S_{BUF}$" represents a variable for temporarily storing a status. "$T_{SPR(i)}$" represents a status established time of a superclass SPR(i). "$T_{CLS}$" represents a status established time of a CLS.

First, an inheritance flag is turned OFF (step 100). The number N of superclasses of a CLS is checked. If there is no superclass (N=0), the status and status established time of the CLS are set and thereafter the processing is terminated (step 102, steps 115 to 119).

If there is any superclass (N>0), "1" is set as the priority order parameter i so that the static inheritance processing is executed from the superclass having the highest priority order (step 103). Next, it is checked if there is an entry of the superclass SPR(i) in the static inheritance status information table 50 (step 104). If there is no entry, the status and the status established time of the CLS are set and thereafter the processing is terminated (steps 105, steps 115 to 119).

If there is an entry in the table 50, the status established time of the superclass SPR(i) is compared with that of the CLS (step 106). If the status established time of the superclass SPR(i) is later than that of the CLS, the inheritance solution processing of the superclass SPR(i) is recursively executed (step 107) to inherit the definition contents of the superclass (step 108) and turn ON the inheritance flag (step 109). Alternatively, if the status established time of the superclass SPR(i) is earlier than that of the CLS, the re-solution processing (steps 107 to 109) of the superclass is not executed. Next, the status of the superclass SPR(i) is checked (step 110). If the status of the superclass is not the complete solution status, the status and status established time of the CLS are set in the inheritance solution status information table 50 (step 105, steps 115 to 119), and thereafter the processing is terminated.

If the status of the superclass SPR(i) is the complete solution status, the priority order of the superclass is first checked (step 112). If there is a superclass having a lower priority order (i<N), the priority order parameter i is renewed to execute the processing for the next superclass (step 114) and return back to step 104. If there is no superclass having a lower priority order, the status and status established time of the CLS are set (step 102, steps 115 to 119), and thereafter the processing is terminated.

In setting the status and status established time, if the CLS has not its entry in the inheritance solution status information table 50, an entry of the CLS is generated (step 116) to thereafter set $T_{CLS}$ and $S_{CLS}$ (steps 118 and 119). If there is an entry of the CLS, the inheritance flag is checked (step 117). If the flag is ON, $T_{CLS}$ is updated (step 118) and $S_{CLS}$ is set (step 119). If the inheritance flag is OFF, $T_{CLS}$ is not updated but only $S_{CLS}$ is set (step 119).

The above-described static inheritance processing does not depend on the solution timings. If a static inheritance processing for a class with new definition or modified definition is executed prior to issuing a message, an inheritance solution can be carried out statistically.

Figure 7:
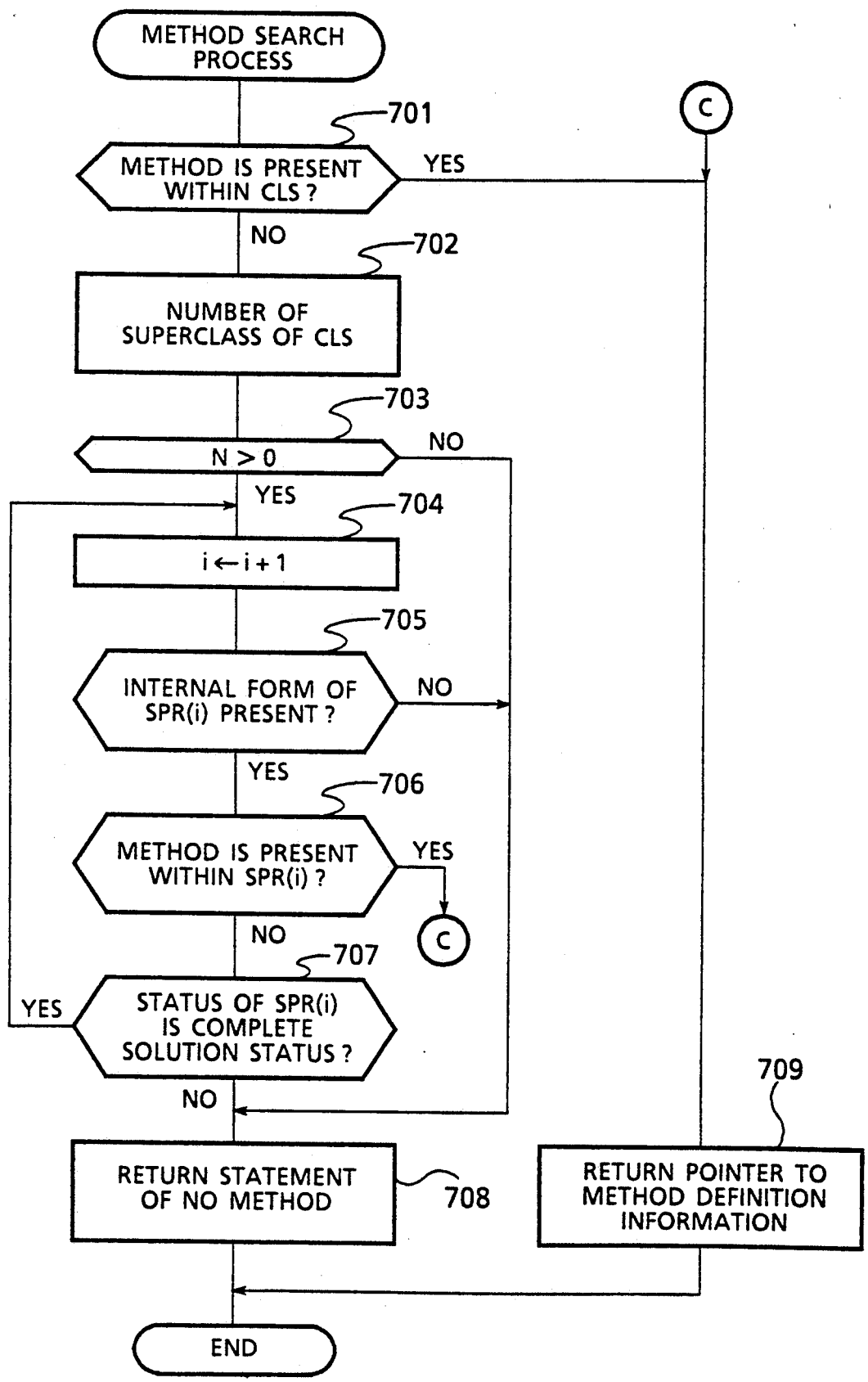
FIG. 7 is a flow chart showing the processing of searching a method.

FIG. 7 shows the processing of searching a method by the message processing unit 302 under the condition that inheritance has been solved in the above manner.

A message to be processed by the message processing unit 302 is assumed that it is constructed of a selector indicating a method to be activated and a receiver meaning a receptor for the message. In FIG. 7, "CLS" represents a class to which the receiver belongs, and "SPR(i)" represents a superclass of a CLS having the priority order i.

The message processing unit 302 shown in FIG. 2 searches a method designated by the selector from a CLS (step 701). If there is the method, a pointer to the method definition information is returned, and thereafter the processing is terminated (step 709). If the method is not present within the CLS at step 701, the method is sequentially searched from superclasses of the CLS in the priority order (steps 702 to 707). The steps 702 to 707 are executed by the dynamic inheritance processing unit 309 in the message processing unit 302. If there is the method at step 706, a pointer to the method definition information is returned, and thereafter the processing is terminated (step 709). If the method is not present at step 706 and the status of the superclass is not the complete solution status at step 707, then the superclasses having the priority order (i+1) or lower are not searched and a statement that the method is not present is returned, and thereafter the processing is terminated (step 708).

Searching a method designated by the selector from class A means to judge whether or not a method having a name designated by the selector is present within the method definition information of the internal form of class A.

In searching the method from a superclass SPR(i) (step 706), the method search processing shown in FIG. 7 is recurrently carried out with respect to the SPR(i) and its superclass.

The dynamic inheritance solution according to the present invention will be described next. With the dynamic inheritance solution of the present invention, inheritance solution is carried out if necessary while searching a message.

Figure 8:
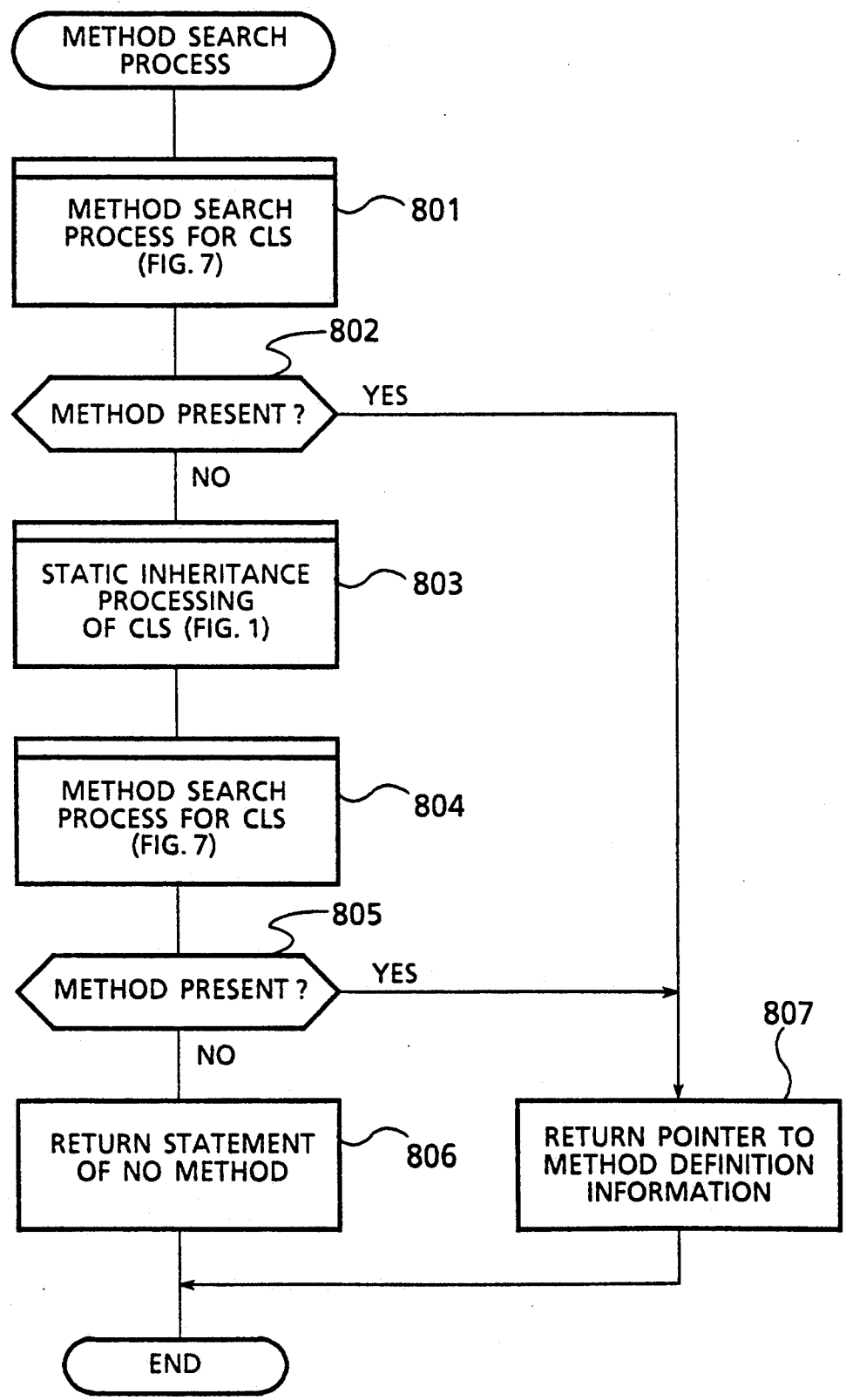
FIG. 8 is a flow chart showing a dynamic inheritance solution processing of the present invention.

FIG. 8 is a flow chart showing the method search processing using the dynamic inheritance solution. In FIG. 8, "CLS" represents the class to which the receiver of a message belongs.

The message processing unit 302 shown in FIG. 2 first searches a method designated by the selector from a CLS (step 801). In accordance with the execution results at step 801, it is judged if the method is present or not (step 802). If the method is present, a pointer to the method definition information is returned, and thereafter the processing is terminated (step 807). If the method is not present in the CLS, the class definition unit 303 is caused to execute the static inheritance processing of the CLS (step 803). After the static inheritance processing, the method is again searched from the CLS. The search results are judged at step 805. If the method is present, a pointer to the method definition information is returned, and thereafter the processing is terminated (step 807). If the method is not present, a statement that the designated method is not present is returned, and the processing is terminated (step 806).

In the above manner, the message processing unit 302 and class definition unit 303 operate together to execute the dynamic inheritance solution processing.

The static inheritance re-processing of a superclass SPR(i) caused by the static inheritance processing of a class CLS has been described with reference to FIG. 1. In order to solve all inheritances which can be solved statistically, it becomes necessary to adopt an extended processing by which after the processing shown in FIG. 1, the static inheritance reprocessing of subclasses of a CLS is executed.

Such extended static inheritance processing will be described with reference to FIG. 9.

Figure 9:
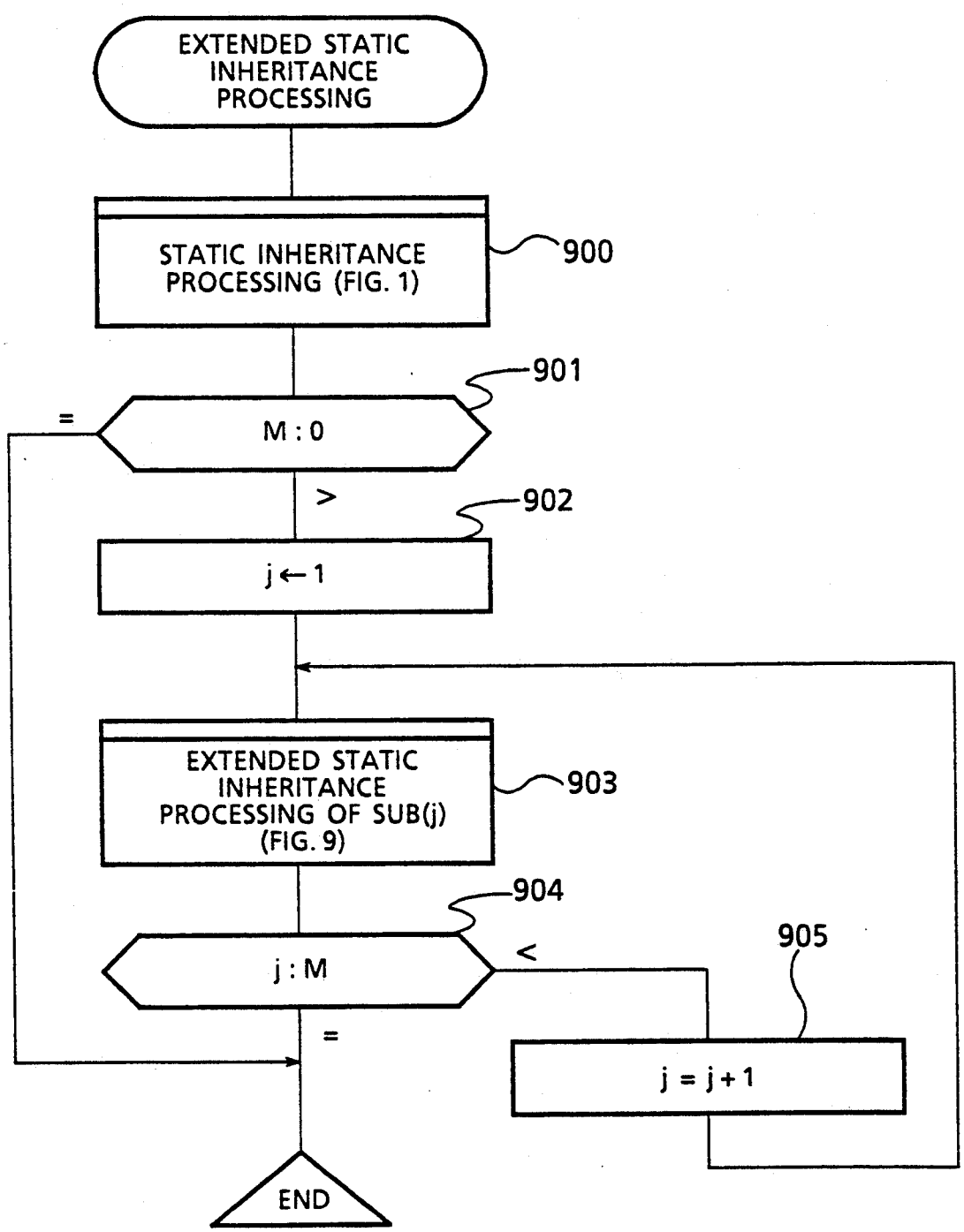
FIG. 9 is a flow chart showing an extended static inheritance processing of the present invention.

In FIG. 9, "SUB(j)" represents a subclass of a CLS used in FIG. 1, and "M" represents the number of subclasses. After the completion of the static inheritance processing of a CLS described with FIG. 1 (step 900), the number of subclasses of the CLS is checked (step 901). If there is no subclass, the processing is terminated. If there is a subclass, the extended static inheritance processing is carried out with respect to the subclass (step 903). After the extended static inheritance processing is carried out for all subclasses (steps 902 to 905), the processing is terminated. In order to efficiently execute the extended static inheritance processing, a list of subclasses may be provided to each class for supervising them.

As described so far, according to the present invention, partial inheritance solution can be performed efficiently using the definition contents at the intermediate stage of application development, while considering the priority order of superclasses. Furthermore, the static inheritance re-processing can be performed reliably and efficiently with respect to only necessary classes already defined.

What is claimed is:

1. A class inheritance solution process for an object-oriented data processing and programming system which defines inheritance relationships between a plurality of superclasses and each class which is a subclass of the superclasses, and the inheritance priority order of the superclasses, and executes the data processing by solving the inheritance relationship of the class in accordance with the priority order, said process comprising the steps of:

at a static inheritance processing unit, storing status information and time information of each class in storage means, said status information being representative of the results of a judgment whether or not inheritance between the class and the superclasses can be completely solved, and said time information being representative of a time when said status is established;

if a judgment of a status of the class is required again, referring to said storage means, and if the status established time of said class is earlier than that of said superclass to be inherited, executing again a status judgment of said superclass and thereafter inheriting the definition contents of said superclass to said class;

if an execution of a method is requested by a message to an object of the class, searching for said method from the class, if said method is not present within said class, sequentially selecting as a search target superclass a superclass of the class having a higher priority order to search the method, if said method is not present within the target superclass, referring to the status of said target superclass stored in said storage means, and in accordance with the status, determining whether or not a search for the method is to be continued using as a search target superclass a superclass having a lower priority order.

2. A class inheritance solution process according to claim 1, further comprising a step of:

selecting one of said superclasses to be inherited in said priority order, and if the status established time information of said selected superclass is later than that of said class the inheritance for which is to be solved, omitting the processing of inheriting the definition contents from said superclass, and selecting a superclass to be inherited having the next priority order.

3. A class inheritance solution process according to claim 1, further comprising a step of:

selecting one of said superclasses to be inherited in said priority order, and if the execution results of said static inheritance processing of said selected superclass result in an incomplete solution status, terminating said static inheritance processing of said class while omitting said static inheritance processing of the other superclasses having a lower priority order.

4. A class inheritance solution method process according to claim 1, further comprising a step of:

after executing said inheritance solution processing, judging if there is a subclass of said class, and if there is a subclass, recursively executing said static inheritance processing of said subclass.

5. A class inheritance solution process according to claim 1, further comprising a step of:

providing to each class a list of subclasses which designate said class as a superclass, and executing said static inheritance processing of said subclass using said list.

6. A class inheritance solution process according to claim 1 further comprising the steps of:

sequentially storing status information and time information of each class in a memory, said status information being representative of whether or not inheritance between the class and the superclasses can be completely solved, and said time information being representative of a time when said status is established;

in response to a request of an inheritance solution processing of a particular class, selecting a target superclass to be subject to said inheritance solution processing sequentially in the priority order;

comparing the status established time of said class with that of said target superclass;

if the status established time of said class is earlier than that of said target superclass, recurrently executing said inheritance solution processing of said target superclass, and thereafter inheriting the definition contents of said target superclass to said class; and if the status established time of said class is later than that of said target superclass said inheritance solution processing is omitted.

7. An object-oriented data base management system comprising:

a message processing unit for executing a method for an object;

a class definition unit for defining a class; and an object management unit for storing and managing said object, wherein:

said class definition unit analyzes a class definition of a source form and generates a class object of a predetermined form, said class definition unit including a static inheritance processing unit which judges whether or not inheritance of a superclass designated in the class definition can be solved in accordance with the definitions regarding the inheritance relationship between the class and the superclass and the inheritance priority order, and a dynamic inheritance processing unit for searching for a method in accordance with a judgment given by said static inheritance processing unit;

said static inheritance processing unit includes table means provided for each class for updating and storing inheritance solution status information including status information and a status established time, said status information being representative of whether or not the inheritance of a superclass can be completely solved, and said status established time being a time when said status is established, and upon input of a class requesting a judgment of the status, said static inheritance processing unit executes the judgment of the status in accordance with the relational inheritance solution status information stored in said table means; and said dynamic inheritance processing unit sequentially selects as a search target superclass a superclass of the class having a higher priority order to search for said method, if said method is not present within the target superclass, in accordance with the status of said target superclass stored in said table means, determining whether or not a search for said method is to be continued using as a search target superclass a superclass having a lower priority order.

* * * * *